(No Model.)

E. J. METZGER.
SCRAPING IMPLEMENT.

No. 462,445. Patented Nov. 3, 1891.

WITNESSES:
J. J. Laass.
Mark W. Dewey

INVENTOR:
Edward J. Metzger
BY
Dull, Laass & Dull
his ATTORNEYS

UNITED STATES PATENT OFFICE.

EDWARD J. METZGER, OF ELMIRA, NEW YORK.

SCRAPING IMPLEMENT.

SPECIFICATION forming part of Letters Patent No. 462,445, dated November 3, 1891.

Application filed April 5, 1890. Renewed July 24, 1891. Serial No. 400,582. (No model.)

*To all whom it may concern:*

Be it known that I, EDWARD J. METZGER, of Elmira, in the county of Chemung, in the State of New York, have invented new and useful Improvements in Scraping Implements, of which the following, taken in connection with the accompanying drawings, is a full, clear, and exact description.

This invention consists in a novel construction of an implement designed for scraping meat-blocks in cleaning the same and for other analogous purposes, and which implement consists of a prolonged and approximately-straight shank having its rear end passing through the handle and secured thereto and terminating at the opposite end with an integral plate extending from opposite sides of the shank at right angles thereto and downward and at an obtuse angle to the shank and formed with a rabbet in its front, and the scraper-blade secured in said rabbet by screws passing through the blade and back plate, all as hereinafter more fully described, and specifically set forth in the claim.

Figure 1:
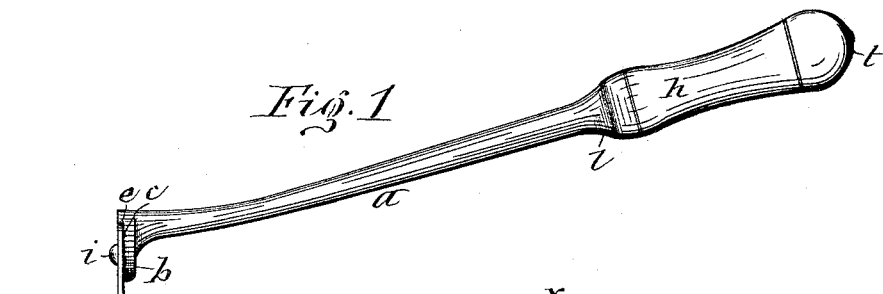
Figure 2:
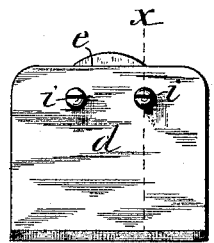
Figure 3:
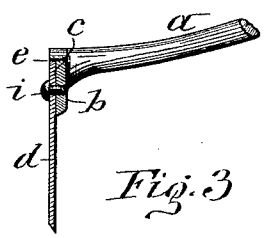
Figure 4:
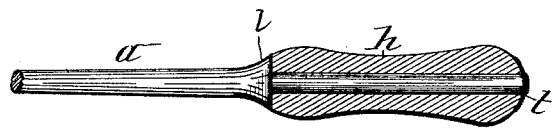

In the annexed drawings, Figure 1 is a side view of a scraping implement embodying my improvements. Fig. 2 is a front end view of the same. Fig. 3 is a transverse section on line $x\,x$, Fig. 2; and Fig. 4 is a longitudinal sectional view of the attachment of the wooden handle.

Similar letters of reference indicate corresponding parts.

$a$ represents the shank or arm of the scraping implement, which shank consists of a prolonged stiff metal bar, which terminates with an integral plate $b$ on one end thereof, said plate standing crosswise of the shank $a$ and extending at right angles from opposite sides thereof and downward therefrom obliquely and at an obtuse angle to the under side of the shank, as shown in Fig. 1 of the drawings.

The plate $b$ is formed with a rabbet $c$, extending across the front thereof and from the bottom part way to the top of the plate, leaving the shoulder $e$ across the upper part of the plate. In said rabbet is secured the scraping-blade $d$, preferably by means of screws $i\,i$, passing transversely through the blade $d$ and plate $b$. Said screws being removable, allows the blade $d$ to be detached when desired to repair or renew the same or to substitute therefor a blade of a different shape or size. The abutment of the top edge of the blade $d$ against the shoulder $e$ serves to sustain said blade to resist the pressure exerted vertically or endwise on the same. To the opposite end of the shank $a$ is secured the wooden handle $h$, which is made tubular and receives through it the end portion of the shank $a$, and is retained thereon by a collar $l$, formed on the shank and bearing on one end of the handle $h$ and a washer $t$, slipped onto the protruding end of the shank and held against the corresponding end of the handle $h$ by the upsetting or riveting of the said end of the shank, as illustrated in Fig. 4 of the drawings.

It will be observed that my improved scraper has all of its components of such form as to render the manufacture thereof very cheap, and it carries the scraping-blade in a most secure manner and at such an angle in relation to the shank of the implement as to allow said blade to be brought more conveniently into its requisite position for scraping a meat-block or other analogous article.

In operating the described meat-block scraper the operator, standing at the side of the meat-block, takes hold of the handle $h$ by one hand, and while drawing the implement across the block he presses with his other hand down upon the shank $a$ to cause the blade $d$ to effectually scrape the block, the prolonged shank $a$ affording the necessary leverage for that purpose. The plate $b$ being integral with said shank, obviates the danger of said parts becoming detached from each other during the operation of scraping the block. The downwardly-oblique position of the plate $b$ and blade $d$ in relation to the shank $a$ is also essential to the proper and convenient operation of the implement, inasmuch as the top of the meat-block is always quite low in its position in relation to the person operating thereon.

What I claim as my invention is—

As a new article of manufacture, the improved meat-block scraper consisting of the solid shank $a$, provided at one end with a plate $b$, formed integral with said shank and extending at right angles from opposite sides thereof and downward at an obtuse angle to the shank and provided with a rabbet $c$, the other end provided with a suitable handle, through which the said shank extends, and the scraping-blade seated in said rabbet and detachably secured to the plate by means of screws.

In testimony whereof I have hereunto signed my name this 31st day of March, 1890.

EDWARD J. METZGER. [L. S.]

Witnesses:
H. C. MANDEVILLE,
EDW. G. HERENDEM.